United States Patent
Yuan

(10) Patent No.: US 8,075,227 B2
(45) Date of Patent: Dec. 13, 2011

(54) DEVICE TO TRANSFER CATALYST FROM A LOW PRESSURE VESSEL TO A HIGH PRESSURE VESSEL AND PURGE THE TRANSFERRED CATALYST

(75) Inventor: Leon Yuan, Rockville, MD (US)

(73) Assignee: UOP LLC, Des Plaines, IL (US)

( * ) Notice: Subject to any disclaimer, the term of this patent is extended or adjusted under 35 U.S.C. 154(b) by 1047 days.

(21) Appl. No.: 11/949,016

(22) Filed: Nov. 30, 2007

(65) Prior Publication Data

US 2011/0217130 A1 Sep. 8, 2011

(51) Int. Cl.
*B65G 53/04* (2006.01)
(52) U.S. Cl. .......... 406/93; 406/124; 406/127; 406/144; 422/291; 422/296; 208/176
(58) Field of Classification Search .................... 406/93, 406/94, 95, 124, 127, 144, 146; 208/147, 208/173, 176; 422/291, 296, 624
See application file for complete search history.

(56) References Cited

U.S. PATENT DOCUMENTS

| | | | |
|---|---|---|---|
| 2,705,080 A * | 3/1955 | Hicks | 414/220 |
| 3,725,249 A * | 4/1973 | Vesely et al. | 208/139 |
| 4,327,055 A * | 4/1982 | Luckenbach et al. | 422/110 |
| 4,341,740 A * | 7/1982 | Greenwood | 422/310 |
| 4,374,540 A | 2/1983 | Massey et al. | 165/1 |
| 4,403,909 A * | 9/1983 | Greenwood | 414/805 |
| 4,576,712 A * | 3/1986 | Greenwood | 208/138 |
| 4,758,118 A * | 7/1988 | Rachner et al. | 406/24 |
| 4,859,315 A | 8/1989 | Bartholic | |
| 4,872,969 A * | 10/1989 | Sechrist | 208/173 |
| 5,143,521 A * | 9/1992 | Dewitz | 48/210 |
| 5,338,440 A * | 8/1994 | Sechrist et al. | 208/173 |
| 5,449,496 A * | 9/1995 | Pontier et al. | 422/144 |
| 5,512,166 A | 4/1996 | Herrenschmidt et al. | |
| 5,558,472 A * | 9/1996 | Ogawa et al. | 406/12 |
| 6,461,992 B1 * | 10/2002 | Sechrist et al. | 502/35 |
| 6,648,558 B1 * | 11/2003 | Shultz | 406/195 |
| 6,657,096 B2 * | 12/2003 | Boehner et al. | 585/418 |
| 6,666,629 B2 * | 12/2003 | Hirsch et al. | 406/197 |
| 6,814,943 B2 | 11/2004 | Radcliffe et al. | 422/189 |
| 6,868,876 B2 * | 3/2005 | Nobbe | 141/286 |
| 7,172,738 B2 | 2/2007 | Russell et al. | |
| 7,600,950 B2 * | 10/2009 | Yuan | 406/156 |
| 7,841,807 B2 * | 11/2010 | Naunheimer et al. | 406/197 |
| 7,841,808 B2 * | 11/2010 | Naunheimer | 406/197 |
| 7,874,769 B2 * | 1/2011 | Naunheimer et al. | 406/197 |
| 7,875,755 B2 * | 1/2011 | Voskoboynikov | 585/324 |
| 7,878,736 B2 * | 2/2011 | Naunheimer et al. | 406/192 |
| 7,878,737 B2 * | 2/2011 | Naunheimer | 406/192 |
| 7,887,264 B2 * | 2/2011 | Naunheimer et al. | 406/192 |
| 7,998,429 B2 * | 8/2011 | Vetter et al. | 422/216 |

* cited by examiner

*Primary Examiner* — Joseph A Dillon, Jr.
(74) *Attorney, Agent, or Firm* — Arthur E Gooding

(57) ABSTRACT

An apparatus for the transfer of solid particulate matter from a low pressure system to a high pressure system is presented. The apparatus simplifies the particle transfer process, and is useful for systems where solid catalyst particles are cycled through a reactor and a regenerator.

11 Claims, 1 Drawing Sheet

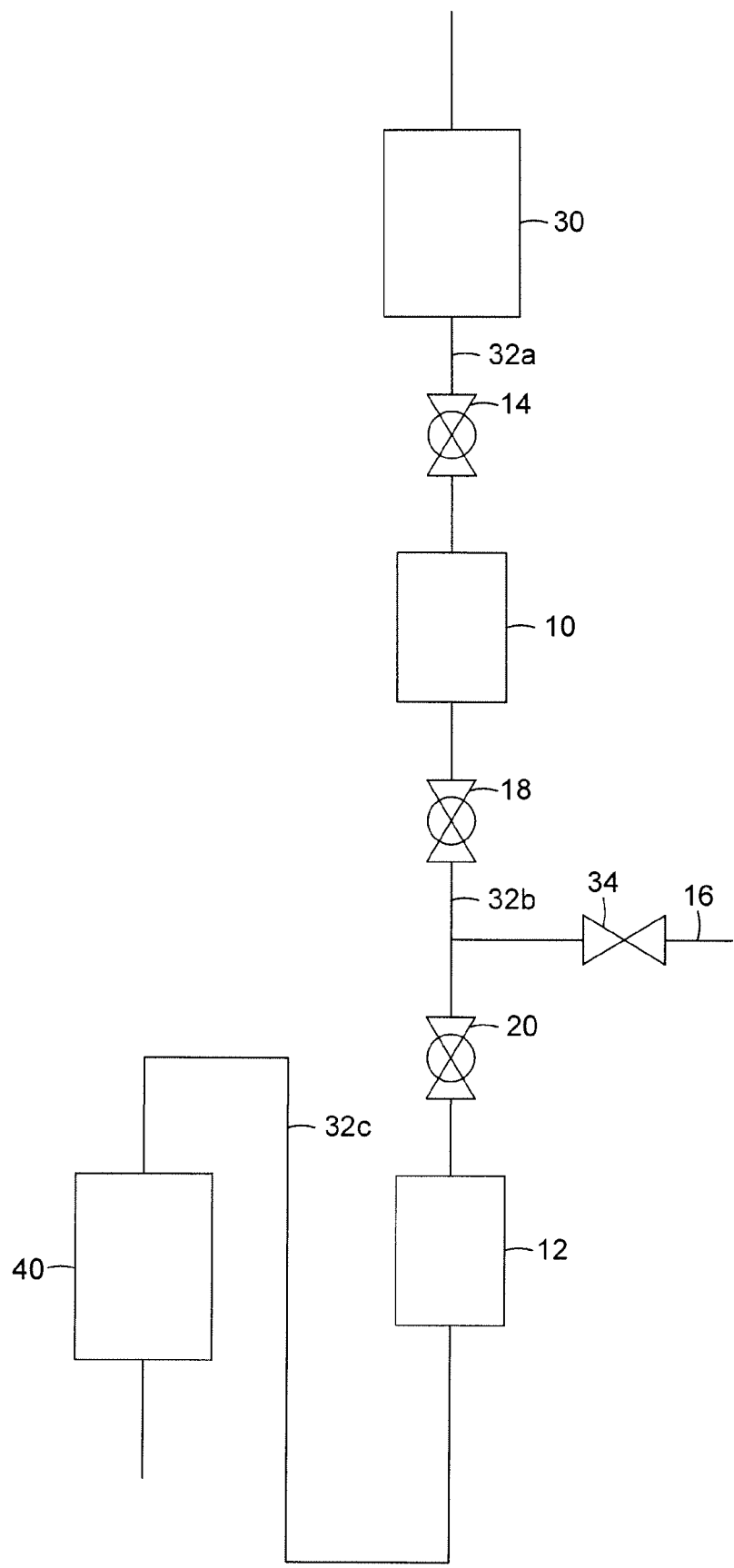

DEVICE TO TRANSFER CATALYST FROM A LOW PRESSURE VESSEL TO A HIGH PRESSURE VESSEL AND PURGE THE TRANSFERRED CATALYST

BACKGROUND OF THE INVENTION

This invention relates to the handling of solid materials, and particularly the handling of solid particulate materials where they are passed from a low pressure system to a higher pressure system. There are many processes in the petrochemical industry that use catalysts and adsorbents. The catalysts and adsorbents are frequently transferred between reaction units and regeneration units, and often there is a flow of the catalyst and/or adsorbent through the system comprising the reaction unit and the regeneration unit.

Currently, the transfer of catalyst between two vessels with reverse pressure gradient is achieved by using a valved lock hopper and flow control hopper, by valved lock hopper with a nuclear level detection instrument or by using a valveless hopper. The flow control and valved lock hopper is used to change the pressure and environment, in order to transfer the solid material from a lower pressure vessel to a higher pressure vessel. In a flow control and valved lock hopper, the flow control hopper and the valved lock hopper are separated. The flow control hopper is used to control the flow of solid particles and the valved lock hopper is used to change the pressure and environment, that is to raise the pressure for the solid particles to be transferred. In a valved lock hopper with a nuclear level detection instrument, the flow control and pressure change is combined into one gas tight valved lock hopper with nuclear level detection, the nuclear level detection is used to control the flow rate of solids by loading and unloading between the high and low level in a given time interval and the gas tight valved lock hopper changes the pressure and environment. With a valveless lock hopper, the flow control and pressure change is also combined into the lock hopper, where the hopper has three internal compartments. The pressure is cycled in the middle compartment with nuclear level detection and the solid particles are transferred from the top compartment to the middle compartment to the bottom compartment in a batchwise manner, when the pressure is equalized between the top and middle compartments and then the middle and bottom compartments The control of the solid flow rate is achieved by batchwise solid transfer between the high and low nuclear level detection for a given time interval.

Continuous nuclear level detection is typically used where most other technologies are unsuccessful. Different radioactive isotopes are used, based on the penetrating power needed to pass through a vessel and the material in the vessel. Radiation from the source is detected on the other side of the vessel. Its strength indicates the level of the material in the vessel. The devices are noninvasive, making them very useful for the dusty environments associated with solids handling. The level detection is affected by density changes as the vessel fills with solids.

Problems exist for the first two systems which add to maintenance and the loss of catalyst through grinding that creates fines, especially in the gas tight valves where the valves are completely closed in the solid and gas lines in the dusty environment and which eventually develop leaks. The valveless lock hopper loads and unloads the solids by changing the hydraulics which is sensitive toward the design of the vessel and the solid transfer pipe between the vessel. This can develop a phenomenon call "seal loss" which is when the reverse pressure in the solid transfer line is too high and blows the solids to empty the solid seal in the transfer pipe.

BRIEF SUMMARY OF THE INVENTION

A solution for the problem of transferring solid particles from a low pressure vessel to a high pressure vessel can improve operation and save time and money. The present invention provides for a smaller, simpler and less expensive apparatus for transferring solid catalyst from a low pressure vessel to a high pressure vessel and to control the flow rate without the need of a nuclear level instrument. The apparatus comprises a flow control vessel situated between the low pressure vessel and the high pressure vessel and is in fluids communication with the low pressure vessel and the high pressure vessel through a solids transfer line. The flow control vessel is smaller than either the low pressure vessel or the high pressure vessel. The apparatus includes the flow control vessel for collecting transferred particles for subsequent feed to the high pressure vessel. Situated between each of the vessels are solid particle transfer valves for controlling the flow of solids through the apparatus, and for controlling the pressure levels in the flow control vessel. The apparatus further comprises a high pressure inert gas source for supplying inert gas to the flow control vessel at a pressure at least as great as the pressure in the high pressure vessel. The high pressure inert gas in controlled through a valve to regulate the pressure in the flow control vessel and in the intermediate section of the solids transfer line.

Other objects, advantages and applications of the present invention will become apparent to those skilled in the art from the following detailed description and drawing.

BRIEF DESCRIPTION OF THE DRAWING

The drawing is a schematic for the apparatus and process for transferring solids from a low pressure vessel to a high pressure vessel.

DETAILED DESCRIPTION OF THE INVENTION

There are many processes that involve the transfer of solids between vessels. While many processes allow for the transfer through fluidization, or the use of positive pressure differentials, often there are processes where the vessels containing the solids are operated at different conditions. A particular problem exists when the solids, usually in particulate form, need to be transferred from a lower pressure vessel to a higher pressure vessel. To avoid the need for extra vessels for the transfer of solids, or for large complex vessels having segregated internal chambers, it has been found that a single smaller vessel can handle the transfer. An important process that passes solid catalyst from a low pressure system to a high pressure system involves moving bed systems where solid catalyst particles cycle between a reactor bed and a regenerator.

The present invention, as illustrated in the FIGURE, comprises a flow control vessel 10, a surge hopper 12, a first solid particle transfer valve 14, a high pressure inert gas source 16, a second solid particle transfer valve 18, and a third solid particle transfer valve 20. The flow control vessel 10 is disposed between a low pressure vessel 30 and a high pressure vessel 40. The flow control vessel 10 is in fluid communication with the low 30 and high 40 pressure vessels through a solid particle transfer line 32. The surge hopper 12 is disposed between the flow control vessel 10 and the high pressure vessel 40, and is in fluid communication with the flow control vessel 10 and the high pressure vessel 40 through the solid particle transfer line 32.

The first particle transfer valve 14 is disposed between the low pressure vessel 30 and the flow control vessel 10, and used to admit or close off solid particle flow between the low pressure vessel 30 and the flow control vessel 10. The second particle transfer valve 18 and the third particle transfer valve 20 are disposed between the flow control vessel 10 and the surge hopper 12. The second particle transfer valve 18 and the third particle transfer valve 20 control the flow of solid particles between the flow control vessel 10 and the surge hopper 12. The surge hopper provides for surge volume of catalyst particles to be fed to the high pressure vessel 40, or the surge volume can be included into the high pressure vessel 40 and the surge hopper 12 can be eliminated. The high pressure inert gas source 16 provides for controlling pressure levels in the flow control vessel 10, and for providing an inert gas blanket to prevent the backflow of gas from the high pressure vessel 40 to the low pressure vessel 30. The high pressure inert gas source 16 is controlled through a valve 34 to regulate the pressure in the solid transfer line 32 and the flow control vessel 10. The inert gas source is preferably fed from a high pressure gas line, and can be any inert gas such as nitrogen or argon. The inert gas source can also be provided by a high pressure tank that is periodically replaced or recharged.

The solid transfer line 32 includes sections, 32a, 32b, 32c that provide fluid communication between the different components of the invention. The low pressure vessel 30 and the flow control vessel 10 have fluid communication through a first section 32a; the flow control vessel 10 and the surge hopper 12 have fluid communication through a second section 32b; and the surge hopper 12 and the high pressure vessel 40 have fluid communication through a third section 32c. It is preferred that the portion of the second section 32b disposed between the second 18 and third 20 solid transfer valves be kept at a pressure at least as great as the pressure of the surge hopper 12, and more preferably at a pressure greater than the surge hopper 12, which in turn is at a pressure greater than the low pressure vessel 30. In the case where the surge volume is included in the high pressure vessel 40, then the pressure of the second section 32b of the solid transfer line should be kept at a pressure greater than or equal to the pressure of the high pressure vessel 40. This pressure in the portion of the second section 32b disposed between the second 18 and third 20 solid transfer valves is controlled by the high pressure source control valve 34.

The process of the flow of particles is more smoothly implemented when the flow control vessel 10 is small relative to the size of the low pressure vessel 30 and the high pressure vessel 40. It is preferred to have the flow control vessel to be less than 10% of the volume of surge hopper 12 or of the low pressure vessel 30. If the surge function is incorporated into the high pressure vessel 40, it is preferred to have the flow control vessel 10 be less than 10% of the volume of the high pressure vessel 40. Depending on the size and amount of solid particles to be transferred, a flow control vessel 10 having a size less than 3% of the volume of the high pressure vessel 40 if the surge function is incorporated into the high pressure vessel 40 or the low pressure vessel 30 can provide for a smoother transfer of solids without significant pressure surging even if the pressure is not completely balanced between the flow control vessel 10 and either the low pressure vessel 30 or the high pressure vessel 40. When the surge hopper 12 is not a part of the high pressure vessel 40, it is preferred to have the flow control vessel 10 having a size less than 3% of the volume of the surge hopper 12 or the low pressure vessel 30.

The invention allows for non-gas tight valves that allow some gas leakage. One type of valve is a ball valve with a vee-shaped opening. The use of non-gas tight valves reduces that amount of grinding of solid catalyst particles. By using a smaller volume flow control vessel with non-gas tight valves, pressure can be maintained in the flow control vessel during the solids transfer. The use of non-gas tight valves allows for lower continuous purging of the solid particles in the flow control vessel 10 when the flow control vessel 10 is loaded. During the loading step, the pressure is the same between the flow control vessel 10 and the low pressure vessel 30, but the continuous leak of inert gas through the valve 18 will continuously purge the particles in the flow control vessel 10. The use of non-gas tight valves does not reduce the ability to pressurize the flow control vessel 10, but increases control over preventing unwanted incursions of gas in the transferred solids from the low pressure vessel 30 to the surge hopper 12 and the high pressure vessel 40.

Using the present invention involves a multistage process for opening and closing the solid particle transfer valves 14, 18, 20. The process comprises a load step, where the second 18 and third 20 solid particle transfer valves are closed. The first solid particle transfer valve 14 is opened allowing solid particles to flow from the low pressure vessel 30 to the flow control vessel 10 through a solids transfer line 32. The inert gas is purging through the leaky closed valves 18 and 20 from line 23b, thereby reducing contaminants on the solids being transferred due to the upward purging of inert gas through the second particle transfer valve 18 and through to the low pressure vessel 30.

The load step is followed by a first transition step where the second solid particle transfer valve 18 is partially opened to increase the flow of inert gas to the flow control vessel 10. Any gas from the low pressure vessel 30 passed to the flow control vessel 10 and the transfer line 32a is further purged by the inert gas. A second transition step follows the first transition step where the first solid particle transfer valve 14 is closed and the flow control vessel 10 is pressurized to a pressure greater than or equal to the pressure in the surge hopper 12 or the high pressure vessel 40, when the surge function is combined into the high pressure vessel 40. The transition steps pressurize the flow control vessel 10 to allow the flow of solids out of the flow control vessel 10.

After the transition steps, the flow control vessel 10 is unloaded. The third solid particle transfer valve 20 is opened and the solid particles flow from the flow control vessel 10 to the surge hopper 12. Following the unloading of the flow control vessel 10, a third transition step is performed where the second 18 and third 20 solid particle transfer valves are closed. The leakage of the first solid particle transfer valve 14 allows the flow control vessel 10 to depressurize. Depressurization can be accelerated during the fourth transition step where the first solid particle transfer valve 14 is opened and the pressure in the flow control vessel 10 is equalized to the low pressure vessel 30.

The pressure from the inert gas is preferably maintained at a pressure level to prevent the backflow of gas from the surge hopper 12 or the high pressure vessel 40. Therefore, it is preferable that the pressure controlled by the pressure control valve 34 is greater than the pressure in the surge hopper or the high pressure vessel 40. This maintains an inert gas buffer between the low pressure vessel 30 and the surge hopper 12 or the high pressure vessel 40, and purges any potential gaseous contaminants that are in the low pressure vessel 30 and are not desired to transfer to the high pressure vessel 40. An important example is when the regeneration of the catalyst is in an oxygen rich environment, and the reactor has a hydrogen rich environment. By using an inert gas at a pressure above the surge hopper 12 and the high pressure vessel 40, a buffer is maintained between the oxygen and hydrogen and provides protection against the dangerous condition of hydrogen and oxygen mixing.

The process is operated to be run on a continuous basis, and the flow control vessel 10 is sized according to the normal operation where there is a semi-continuous flow of solids from the low pressure system to the high pressure system. However, all systems need to be in balance of flow, or a continuous operation is not possible. The transfer of solids is on a semi-continuous, periodic basis, where the process is stopped when there are no solids in the low pressure vessel 30, or when the surge hopper 12 is full. Any acceptable level indicators in the low pressure vessel 30 and the surge hopper 12 can be used to indicate when the discontinuance of the process is needed. The process is therefore continued upon receipt of signals that indicate the solids level indicator is within a preset range of values for both the low pressure vessel 30 and the surge hopper 12. Likewise, the operation can continue until a contrary signal is sent wherein the signal indicates the solids level is either below a preset limit for the low pressure vessel 30 or the signal indicates the solids level is above a preset limit for the surge hopper 12. Equipment for solids level indicators and the associated control equipment are known in the art and are not discussed in detail here.

The solids from the surge hopper 12 can be fed to the high pressure vessel 40 through several methods. One method introduces the solids into a stream of fluid, typically gas, and lifts the solids into the high pressure vessel 40, where the high pressure vessel can be a riser reactor, or other type of reactor. The control of the flow of solids can be through an L-valve, which is one method of delivering solids into a fluid flow stream and controls the solids delivery rate. The surge hopper 12 provides for a continuous feed of solids into the fluid flow stream, the L valve controls how fast the solids shall be lifted out of the surge hopper 12 into the high pressure vessel 40 even though the amount of solids in the surge hopper periodically rises and falls during the operation of the apparatus. The total solid flow into and out of the surge hopper 12 is balanced during the operation cycles.

The use of non-gas tight valves for the solid particle transfer valve allows for low gas flow, or leakage, through the valves. The inert gas leakage upwards through the first 14 and second 18 solids transfer valves to the low pressure vessel 30 adds to the purging of any contaminants entrained in the solid particles in the flow control vessel 10 and provides a blanket of inert gas that prevents the flow of gas from the high pressure vessel 40 and the low pressure vessel 30, as well as maintains separation of the gas environments of the low pressure vessel 30 and the high pressure vessel 40.

While the invention has been described with what are presently considered the preferred embodiments, it is to be understood that the invention is not limited to the disclosed embodiments, but it is intended to cover various modifications and equivalent arrangements included within the scope of the appended claims.

The invention claimed is:

1. An apparatus for transferring solid particulate matter from a low pressure vessel to a high pressure vessel and removal of contaminants transfer with the solids by purging the solid particles at the same time comprising:
    a flow control vessel disposed between and in fluid communication through a solids transfer line with the low pressure vessel and the high pressure vessel;
    a surge function disposed between and in fluid communication through a solids transfer line with the flow control vessel and the high pressure vessel;
    a first solid particle transfer valve disposed between the flow control vessel and the low pressure vessel;
    a high pressure inert gas source having a fluid connection between the flow control vessel and the surge function, delivered through a pressure control valve;
    a second solid particle transfer valve disposed between the flow control vessel and the high pressure inert gas source; and
    a third solid particle transfer valve disposed between the surge hopper and the high pressure inert gas source.

2. The apparatus of claim 1 wherein the surge function is a surge hopper disposed between the flow control vessel and the high pressure vessel.

3. The apparatus of claim 1 wherein the surge function has been combined into the high pressure vessel.

4. The apparatus of claim 1 wherein the inert gas source is a high pressure line.

5. The apparatus of claim 1 wherein the pressure in the solids transfer line between the second and third solid transfer valves is at a pressure greater than the pressure in the low pressure vessel and is at a pressure equal to or greater than the pressure of the surge hopper.

6. The apparatus of claim 5 wherein the pressure in the solids transfer line between the second and third solid transfer valves is controlled by the high pressure inert gas control valve.

7. The apparatus of claim 1 wherein the flow control vessel is less than 10% the volume of the low pressure or high pressure vessel.

8. The apparatus of claim 7 wherein the flow control vessel is less than 3% the volume of the low pressure or high pressure vessel.

9. The apparatus of claim 1 wherein the solid particle transfer valve is ball valve with a vee-shaped opening.

10. The apparatus of claim 1 wherein the solid particle transfer valve is a non-gas tight valve.

11. The apparatus of claim 1 wherein the inert gas is nitrogen ($N_2$).

* * * * *